(12) United States Patent
Mas et al.

(10) Patent No.: US 6,348,283 B1
(45) Date of Patent: Feb. 19, 2002

(54) STORAGE CELL IN WHICH AN ELECTRODE HAS AN EDGE REINFORCED BY A METAL STRIP

(75) Inventors: Jean-François Mas, Merignac; Catherine Godard, Bordeaux, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/453,522

(22) Filed: Dec. 3, 1999

(30) Foreign Application Priority Data

Dec. 24, 1998 (FR) .............................. 98 16428

(51) Int. Cl.[7] .............................................. H01M 2/26
(52) U.S. Cl. ....................................... 429/161; 429/211
(58) Field of Search ............................ 29/2; 429/152, 429/161, 211, 233, 243, 244

(56) References Cited

U.S. PATENT DOCUMENTS

| | | | | |
|---|---|---|---|---|
| 5,154,993 A | * | 10/1992 | Beatty | |
| 5,246,797 A | * | 9/1993 | Imhof et al. | |
| 5,397,659 A | * | 3/1995 | Imhof et al. | |
| 5,456,813 A | * | 10/1995 | Grange-Cossou et al. | |
| 5,558,681 A | * | 9/1996 | Loustau et al. | |
| 5,578,397 A | * | 11/1996 | Verhoog et al. | |
| 5,667,915 A | * | 9/1997 | Loustau et al. | |
| 6,284,408 B1 | * | 9/2001 | Akazawa et al. | |

FOREIGN PATENT DOCUMENTS

| | | |
|---|---|---|
| DE | 2 705 834 A | 12/1994 |
| JP | 63-4562 | * 1/1988 |

* cited by examiner

*Primary Examiner*—Stephen Kalafut
*Assistant Examiner*—Susy Tsang
(74) *Attorney, Agent, or Firm*—Sughrue Mion, PLLC

(57) ABSTRACT

A storage cell comprises at least two electrodes with different polarities disposed face-to-face on respective opposite sides of a separator and a metal strip fixed along an upper edge of a first of the electrodes and extending at least as far as one end of the upper edge. The part of a second of the electrodes facing the strip in line with the aforementioned one end is partly cut away by means of a cut-out.

5 Claims, 2 Drawing Sheets

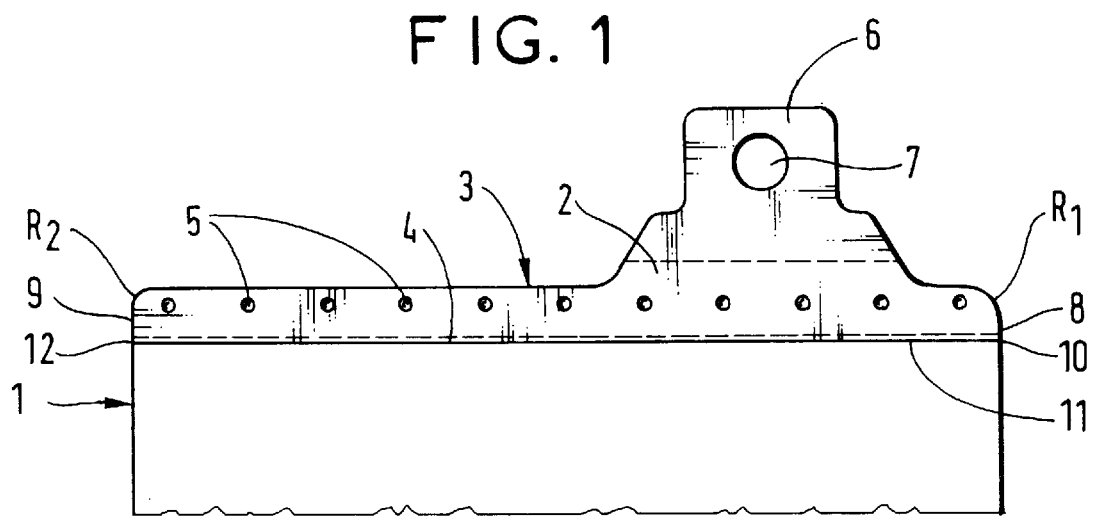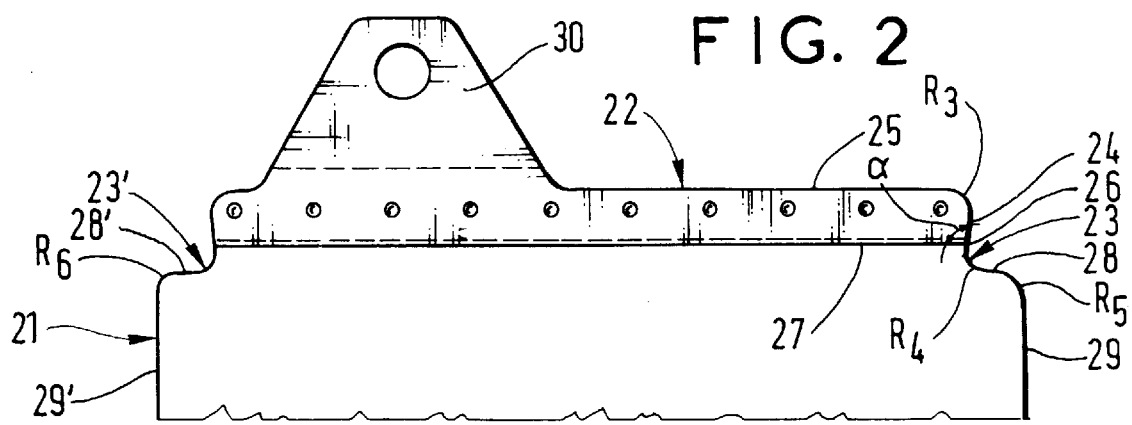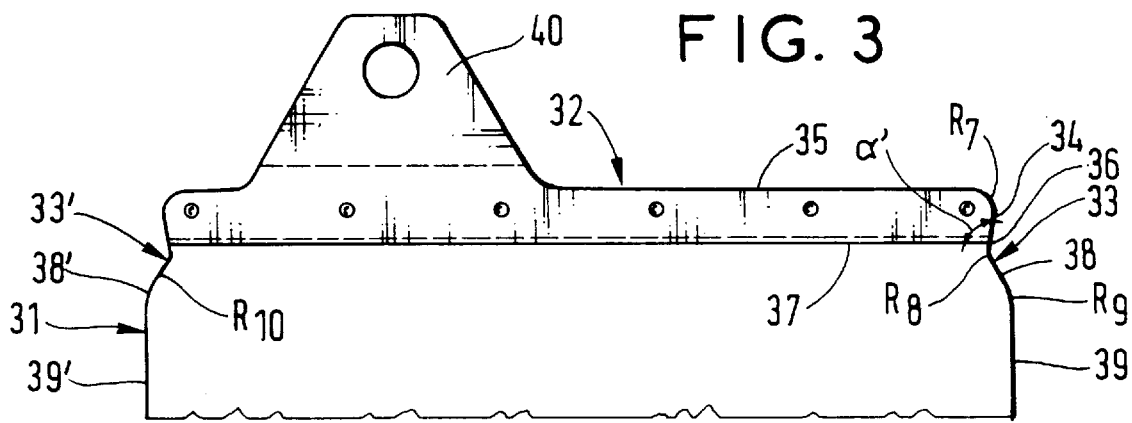

STORAGE CELL IN WHICH AN ELECTRODE HAS AN EDGE REINFORCED BY A METAL STRIP

BACKGROUND OF THE INVENTION

1. Field of the Invention

The present invention concerns a storage cell comprising at least one electrode one edge of which is reinforced by an attached strip.

2. Description of the Prior Art

A storage cell comprises an electrode assembly comprising at least one positive electrode and at least one negative electrode disposed face-to-face on respective opposite sides of an electrically insulative separator. The separator is generally a polymer material felt or membrane impregnated with electrolyte.

When the storage cell is being assembled, the electrode of each polarity must be electrically connected to the respective output terminal. The connection is usually made by a thin metal band which may be cut to a required contour and is fixed to the internal part of the terminal and to the conductive support of the electrode.

To make the fixing of the band sufficiently reliable, the edge of the electrode is reinforced, at least in the fixing area, but more reliably so throughout its length. The band can be welded to the reinforcement or integral with it, as described in French patent 2 705 834.

The member reinforcing the electrode is advantageously a thin metal tape applied to one or both faces and parallel to the edge of the electrode. It is welded in place.

At the end of the tape there is a short distance between the edge of the tape and the last weld. This enables one of the straight corners at the end of the tape to bend as a result of mechanical impact during handling, for example by rubbing on the working surface, when the electrodes are being stacked up or the electrode assembly is being assembled. The separator is mechanically weak and easily torn by the resulting sharp corner, and so a short circuit is inevitable. The object of the present invention is to propose a storage cell in which the risk of a short circuit occurring under the conditions just described is minimized.

SUMMARY OF THE INVENTION

The present invention consists in a storage cell comprising at least two electrodes with different polarities disposed face-to-face on respective opposite sides of a separator and a metal strip fixed along an upper edge of a first of the electrodes and extending at least as far as one end of the upper edge, wherein the part of a second of the electrodes facing the strip in line with the aforementioned one end is partly cut away by means of a cut-out.

The part of the tape of the second electrode that is cut away is the one whose corner faces the corner of the first electrode which is the origin of the short circuits. For reasons of reliability, the cut-out encroaches partly on the part of the electrode coated with active material.

In a preferred embodiment of the invention, the cut-out has first and second sides merging with each other via a rounded portion and merging via respective rounded portions with an upper edge of the strip and a lateral edge of the second electrode.

The first end of the cut-out is a straight line segment which intersects a lower edge of the strip at an angle greater than 90°. This avoids the creation of an acute angle at the intersection which is more vulnerable to mechanical impact.

The second side of the cut-out intersects the lateral edge of the second electrode at an angle greater than 90°, for the same reason as previously.

The cut-out at one end of the strip advantageously has different dimensions to the cut-out at its other end. This slight asymmetry allows for the direction of movement of the tool for cutting the heads of the plates in the metal strip. This facilitates cutting and eliminates the wastage of material along the length of the strip of electrodes.

A single strip 0.2 mm thick, for example, can be applied to one face of the electrode. Two strips, each 0.1 mm thick, for example, can be placed on respective opposite sides of the electrode, and can consist of the same strip bent in two and straddling the edge of the electrode.

The strip is preferably spot welded or knurled wheel welded or ultrasound welded to the first electrode. The weld assures reliable electrical continuity between the current collector of the electrode and the strip.

The electrodes can be of the sintered or non-sintered type. A non-sintered electrode comprises a conductive support and a paste containing the electrochemically active material and a binder.

The electrode support can be a two-dimensional support such as expanded metal, a solid or perforated strip, a grid or a woven fabric, or a three-dimensional support such as a foam or a felt.

The present invention applies to storage cells with an alkaline electrolyte, such as nickel cells, or an organic electrolyte, such as lithium cells. The electrodes can be plane or spiral.

The invention will be better understood and other advantages and features of the invention will become apparent on reading the following description, which is given by way of non-limiting example and with reference to the accompanying drawings.

BRIEF DESCRIPTION OF THE DRAWINGS

FIG. 1 is a partial view of a positive electrode of a storage cell in accordance with the present invention.

FIG. 2 is a partial view of a first embodiment of a negative electrode of a storage cell in accordance with the present invention.

FIG. 3, which is analogous to FIG. 2, is a partial view of a second embodiment of a negative electrode in accordance with the present invention.

DETAILED DESCRIPTION OF THE PREFERRED EMBODIMENTS

Figure 4:
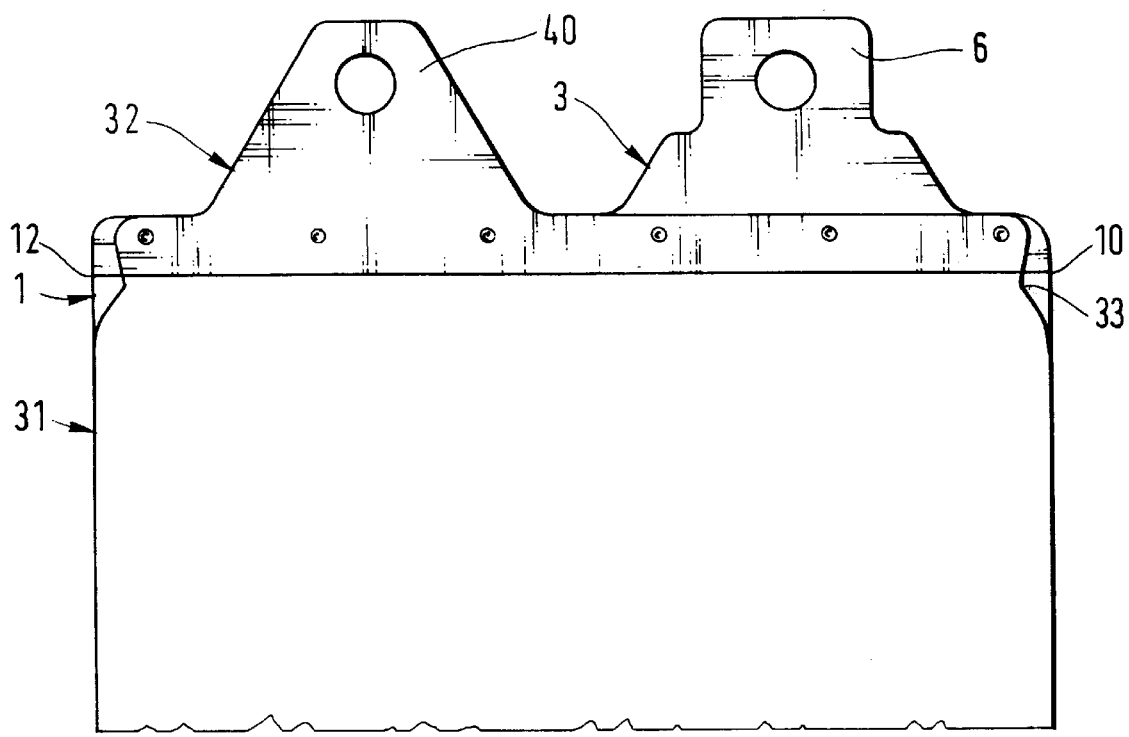
FIG. 4 shows an electrode assembly comprising a positive electrode and a negative electrode between which is a separator (not visible in the figure).

It is to be understood that the drawings and the corresponding parts of the description are given entirely by way of illustration of the subject matter of the invention and in no way constitute any limitation on the scope of the invention. In particular, the various embodiments described and shown and the various numerical applications specified are given purely by way of non-limiting example.

The storage cell in accordance with the invention comprises an electrode assembly made up of at least one positive electrode and at least one negative electrode with a separator between them. The storage cell described by way of example is a nickel-cadmium storage cell with an alkaline electrolyte and plane electrodes.

The positive electrode 1 is in the form of a plane and substantially rectangular plate whose dimensions are approximately 143 mm high by 98 mm wide by 0.9 mm thick. The electrode 1 comprises a nickel foam support containing a paste containing the electrochemically active material, which in this example is a nickel hydroxide.

A strip 2 approximately 5 mm wide along the top edge of the electrode 1 is not coated with active material. As shown in FIG. 1, a wide nickel-plated steel tape 3 is applied to cover the strip 2 and to overlap slightly the part 4 coated with active material. The tape 3 is held in place along the edge of the electrode 1 by regularly spaced spot welds 5.

The tape 3 is then cut to form a plate head 6 for electrically connecting the electrode 1 to the output terminal of the cell. Pressing or rolling after cutting reduces the overthickness created by the tape 3 in the overlap area. The connection between the plate head 6 and the terminal is made by means of a bolt passed through a perforation 7 in the plate head 6, for example, or by welding, in particular by resistance, ultrasound or laser welding.

The end of the tape 3 coincides with the lateral end of the electrode 1. After cutting, the upper part of the tape 3 is rounded with a radius $R_1$=4 mm at the end 8 nearer the plate head 6 and a radius $R_2$=2 mm at the opposite end 9. The corner 10 between the lower edge 11 of the tape 3 and its end 8 covers the active material. During handling of the electrode (stacking, rubbing, etc) the corner 10 can be raised because of mechanical stresses. There is a risk of it piercing the separator and forming a short circuit to the contiguous negative electrode. In a symmetrical fashion, the corner 12 at the opposite end 9 can also be raised.

In a first variant of the invention, the negative electrode 21 is in the form of a plane and substantially rectangular plate whose width is in the same order of magnitude as that of the positive electrode 1. In this example the electrode comprises a support in the form of a nickel-plated perforated strip and is coated with a paste containing cadmium hydroxide.

As shown in FIG. 2, in a similar manner to the positive electrode 1, a metal tape 22 is fixed along the upper edge of the negative electrode 21 where there is no active material. To prevent the corner 10 of the tape 3 of the positive electrode 1 coming into contact with the facing part of the tape 22, a cut-out 23 is formed in the part of the tape 22 at the same end as the edge of the negative electrode 21.

The side 24 of the cut-out 23 merges with the upper edge 25 of the tape 22 through a rounded portion of radius $R_3$=3 mm. The side 24 is a straight line segment approximately 2 mm long. At its intersection 26 with the lower part 27 of the tape 22, the segment 24 is at an angle α of 100° to the part 27. The bottom of the cut-out 23 is substantially semicircular with a radius $R_4$=2 mm.

The other side 28 of the cut-out 23 merges with the lateral edge 29 of the electrode 21 through a rounded portion of radius $R_5$=4 mm.

At the other end of the tape 22 is a cut-out 23' similar to the cut-out 23 except that the side 28' merges with the lateral edge 29' of the electrode 21 through a rounded portion of radius $R_6$=2 mm. This asymmetry allows for the direction of movement relative to the electrode 21 of the tool for cutting the plate head 30.

In a second embodiment of the invention, the negative electrode 31 is in the form of a plane and substantially rectangular plate whose length is in the same order of magnitude as that of the positive electrode 1. In this example the electrode comprises a support in the form of a nickel-plated perforated strip coated with a paste containing a hydridable metal alloy.

As shown in FIG. 3, in a similar manner to the positive electrode 1, a metal tape 32 is fixed along the upper edge of the negative electrode 21 where there is no active material. To prevent the corner 10 of the positive electrode 1 from coming into contact with the facing part of the tape 32, a cut-out 33 is made in the part of the tape 32 at the end of the edge of the negative electrode 31. A plate head 40 is provided for electrically connecting the electrode 31 to an output terminal.

The side 34 of the cut-out 33 merges with the upper edge 35 of the electrode 31 through a rounded portion of radius $R_7$=3 mm. The side 34 is a straight line segment approximately 2 mm long. At its intersection 36 with the lower part 37 of the tape 32 the side 34 is at an angle α' of 100°. The bottom of the cut-out 33 is substantially semicircular with a radius $R_8$=2 mm.

The other side 38 of the cut-out 33 merges with the lateral edge 39 of the electrode 31 through a rounded portion of radius $R_9$=10 mm.

At the other end of the tape 32 is a cut-out 33' similar to the cut-out 33 except that the side 38' merges with the lateral edge 39' of the electrode 31 through a rounded portion of radius $R_{10}$=8 mm.

This embodiment has the advantage that the negative electrode 31 is better protected against impacts during handling.

In FIG. 4, the positive electrode 1 and the negative electrode 31 are disposed face-to-face so that the plate heads 6 and 40 of opposite polarity are offset relative to each other. The corner 10 of the tape 3 of the positive electrode 1 is opposite the cut-out 33 of the negative electrode 31. If clumsy handling causes the corner 10 to become raised, there can be no short circuit, despite tearing of the separator, because the cut-out 33 prevents the corner 10 from coming into contact with the negative electrode 31 in accordance with the invention.

Type A cells comprising at least one prior art positive and negative electrode pair 1, type B cells comprising at least one positive electrode 1/negative electrode 21 pair in accordance with the invention and type C cells comprising at least one positive electrode 1/negative electrode 31 pair in accordance with the invention were assembled.

The number of short circuits that occurred during electrical conditioning of the type A, B and C cells was counted. The results are set out in the table below. The short circuit rate is defined by the number of short circuits observed per 1 000 000 cells.

TABLE

| Cell type | Short circuit rate |
|---|---|
| A | 50 |
| B | 4 |
| C | 0 |

What is claimed is:

1. A storage cell comprising:
   at least two electrodes with different polarities disposed face-to-face on respective opposite sides of a separator;
   a first metal strip fixed along an upper edge of a first of said electrodes and extending at least as far as one side end of said upper edge, and
   a second metal strip fixed along an upper edge of a second of said electrodes, wherein a part of said second of said electrodes facing said first metal strip and opposing said one side end of said first of said electrodes, is partly cut away to form a cut-out.

2. The cell claimed in claim 1 wherein said cut-out has first and second sides merging with each other via a rounded portion and merging via respective rounded portions with an upper edge of said second metal strip and a lateral edge of said second electrode.

3. The cell claimed in claim 2 wherein said first side of said cut-out is a straight line segment which intersects a lower edge of said second metal strip at an angle greater than 90°.

4. The cell claimed in claim 1 wherein said cut-out is formed at side edges of said second of said electrodes, wherein a first cut-out is formed at one end of said second metal strip to have different dimensions than a second cut-out formed at an opposite end of said second metal strip.

5. The cell claimed in claim 1 wherein said first metal strip comprises spot welds or knurled wheel welds or ultrasound welds which connect said first metal strip to said first electrode.

* * * * *